June 6, 1939.    C. W. CRUMRINE    2,161,338
SHUTTER REBOUND CHECK
Filed Jan. 28, 1938
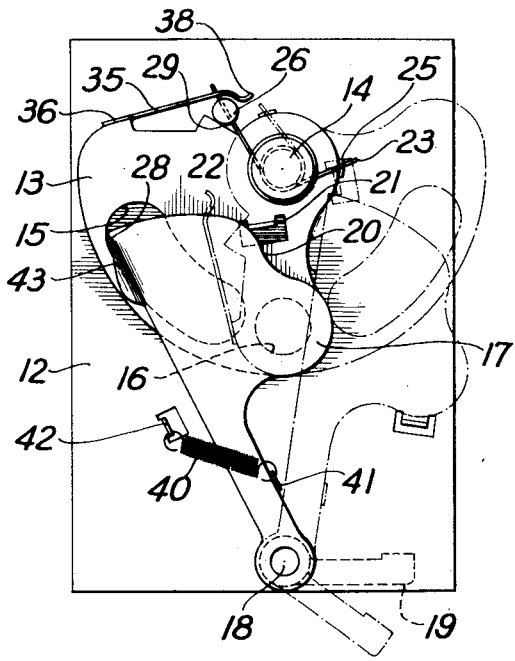
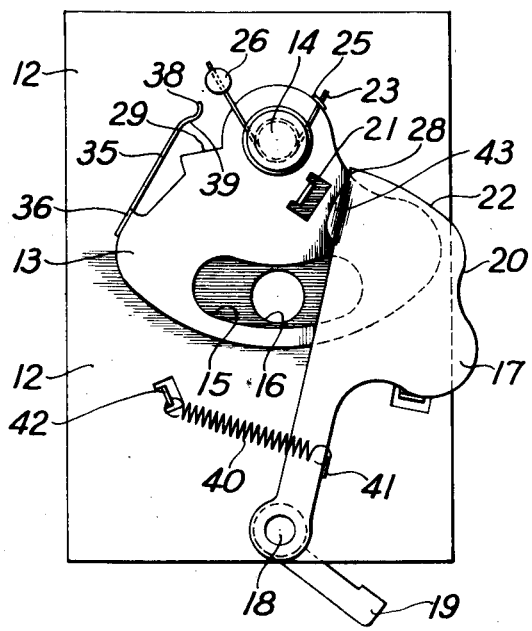
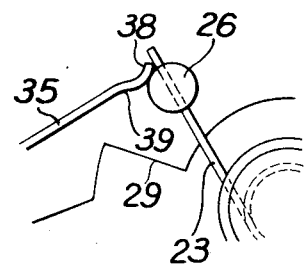
Chester W. Crumrine
INVENTOR
BY
ATTORNEYS.

Patented June 6, 1939

2,161,338

UNITED STATES PATENT OFFICE 2,161,338

SHUTTER REBOUND CHECK

Chester W. Crumrine, Rochester, N. Y., assignor to Eastman Kodak Company, Rochester, N. Y., a corporation of New Jersey Application January 28, 1938, Serial No. 187,460

6 Claims. (Cl. 95—60)

The present invention relates to camera shutters of the blade and cover blind type, and more particularly to an arrangement for retarding the momentum of the shutter, and thus preventing rebound thereof.

One object of the invention is the provision of an arrangement for retarding the momentum of the shutter near the end of its return stroke to prevent or check rebound of the shutter.

Another object of the invention is the provision of a shutter retarding and rebound check which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is an enlarged view of a shutter of the blade and cover blind type, showing the relation thereto of a shutter retarding and rebound check constructed in accordance with the present invention;

Fig. 2 is a view similar to Fig. 1, but with the shutter in position to make a bulb exposure;

Fig. 3 is a fragmentary view of a portion of the mechanism illustrated in Fig. 1, but on a somewhat larger scale, showing the arrangement by which the shutter is retarded on its return stroke.

Similar reference numerals throughout the several views indicate the same parts.

The present invention relates to a shutter rebound check which is adapted to be used on shutters of the blade and cover blind type such as used on box cameras of moderate price. These shutters comprise, in general, a pivoted shutter blade which is arranged to move on a pivot in one direction by means of a shutter trigger so as to tension the shutter spring. At a predetermined point, however, the shutter slips off the trigger, and, under the action of a spring, is quickly returned to its original position. On this return stroke of the shutter, a slot therein momentarily uncovers an opening in the camera to make an instantaneous or snapshot exposure. When, however, the shutter blade is being tensioned, the shutter trigger covers the slot in the shutter blade and thus provides a light trap therefor, as is well known to those in the art.

After the exposure is made, the shutter trigger is released and returned, under the action of a spring, to its original position. Any suitable means such, for example, as shown in the copending application to Ernest B. Burkhardt, Number 144,850, filed May 26, 1937, may be utilized to position the shutter to permit the taking of a bulb exposure.

The drawing shows a shutter of the class described applied to a camera of the box type. The shutter mechanism is mounted on a shutter plate 12 which is secured to the front wall of the camera housing in any suitable and well-known manner. The shutter blade 13 is mounted for oscillation on a pin or stud 14, and is formed with an elongated arcuate slot 15 arranged to uncover a circular opening 16 in the plate 12 through which an exposure is made. The shutter 13 is operated by a shutter trigger 17 which is pivotally mounted on a pin 18, and operated by a lever 19 which is accessible from the front of the camera. The trigger 17 is fixed to and rotatable with the pin 18.

Fig. 1 shows the shutter blade and the trigger in their inoperative position to provide a light trap for the opening 16. To operate the shutter 13, the lever 19 is depressed, thus moving the pin 18 and the trigger 17 in a clockwise direction to bring the leading edge 20 of the trigger into engagement with a lug 21 struck up from the shutter 13. On further depression of the lever 19, the shutter and trigger are moved to the position shown in broken lines Fig. 1, the lug 21 sliding along the upper cam surface 22 of the trigger 17. This movement tensions the shutter spring 23 which is wrapped around the stud 14 and has one end secured to a lug 25 struck up from the shutter 13 and the other end anchored to a pin 26 projecting from the plate 12, as clearly illustrated in Figs. 1 and 2.

When, however, the lug 21 reaches the end of the cam surface 22, it slips over the angular corner 28 of the trigger 17, and, under the action of the spring 23, quickly returns the shutter blade 13 to its original position, as shown in full line in Fig. 1. On this return stroke of the shutter, the slot 15 thereof momentarily uncovers the opening 16 to make an instantaneous or snapshot exposure, the trigger 17 remaining in the position illustrated in Fig. 2. When the shutter 13 reaches the end of the return stroke, a shoulder 29 thereon strikes the pin 26 to bring the shutter to rest. However, due to the inertia of the shutter, the latter may tend to rebound upon striking the pin 26. Such rebound may cause the slot 15 to again momentarily uncover the opening 16, thus causing a double or over-exposure, the disadvantages of which are well known to those in the art.

To overcome this difficulty, the present invention provides an arrangement by which the momentum of the shutter is gradually retarded so that upon reaching the stop 26, the shutter has been substantially brought to rest, or has, at least, been so slowed down that rebound of the shutter is prevented. This retarding mechanism comprises, in the preferred embodiment, a leaf spring 35 one end 36 of which is secured to the edge of the shutter in any well known manner. The free end of the shutter is formed to provide a curved or bent portion 38, as clearly illustrated in the drawing.

Upon the return stroke of the shutter, this curved or bent portion 38 engages and slides over the pin 26 and thus affords a wiping or braking action thereon, as shown in Fig. 3, which retards the momentum of the shutter so as to bring the latter to rest substantially simultaneously with the engagement of the shoulder 29 with the pin 26. As the shutter is thus retarded prior to the actual engagement thereof with the pin 26, shutter rebound is thus prevented. However, after the curved portion 38 wipes over the pin 26, the leaf spring rides clear of the pin 26, as shown in Fig. 1, so as to facilitate the initial movement of the shutter 13 when the latter is operated to make an exposure, as above described. While the wiping action of the portion 38 on the pin 36 is effective to retard the shutter so that the latter is substantially stopped upon engagement thereof with the pin 26, any tendency of the shutter to rebound will bring the trailing edge 39 of the portion 38 into engagement with the pin 26 to positively prevent such rebound. The spring 23 will then move the shutter 13 to bring the shoulder 29 thereof into engagement with the pin 26.

It is apparent from the above description, that the pin 26 serves three separate and distinct purposes. First, it provides an anchor for one end of the shutter spring 23. Second, it affords a stop for the shutter. Third, it presents a surface over which the curved portion 38 of the spring 35 may wipe or slide to retard the shutter. In addition, it also provides an abutment with which the trailing edge 39 of the spring 35 may engage, as pointed out above.

After the exposure has been made, the lever 19 is released, and the trigger 17 is returned to its original position by reason of a coil spring 40, one end of which is fastened to an ear 41 struck up from the trigger 17 while the other end is anchored to a lug 42 formed on the plate 12. To facilitate the return of the trigger 17, the latter is provided with an inclined portion 43 which, upon engaging the lug 21, lifts the trigger 17 so that the latter will slide over the lug to the position illustrated in Fig. 1. This movement may take place because of the flexibility of the thin sheet metal from which the trigger 17 is made.

It is thus apparent from the above description that the present invention provides a shutter rebound check which effectually retards the movement of the shutter as it approaches the end of the return stroke, and thus effectually prevents rebound of the shutter. While the present embodiment shows such a shutter rebound check as applied to a shutter of the blade and cover blind type, it is apparent that it is equally adaptable to various types of shutters of the single blade type.

While one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. In a photographic shutter, the combination with an apertured shutter plate, a shutter pivotally mounted on said plate and adapted to be moved to uncover said aperture to make an exposure, actuating means for said shutter, of a fixed shutter stop mounted on said plate and in the path of said shutter and engageable by the latter to limit the return movement thereof, and shutter retarding means mounted on and movable with said shutter and adapted momentarily to engage said stop to retard the return movement of said shutter and to move out of engagement with said stop upon engagement of said shutter therewith.

2. In a photographic shutter, the combination with an apertured shutter plate, a shutter pivotally mounted on said plate and adapted to be moved to uncover said aperture to make an exposure, actuating means for said shutter, of a shutter stop mounted on said plate and in the path of said shutter to limit the return movement thereof, and a leaf spring mounted on said shutter and arranged to frictionally engage said stop to retard the return movement of said shutter.

3. In a photographic shutter, the combination with an apertured shutter plate, a shutter pivotally mounted on said plate and adapted to be moved to uncover said aperture to make an exposure, actuating means for said shutter, of a shutter stop mounted on said plate and in the path of said shutter to limit the return movement thereof, a flexible member on said shutter arranged to momentarily slidably engage said stop to retard the return movement of said shutter, and means on said member arranged to engage said stop to prevent rebound of said shutter when the latter engages said stop, said member and means being movable out of engagement with said stop upon engagement of said shutter therewith.

4. In a photographic shutter, the combination with an apertured shutter plate, a shutter pivotally mounted on said plate and adapted to be moved to uncover said aperture to make an exposure, actuating means for said shutter, of a shutter stop mounted on said plate and in the path of said shutter to limit the return movement thereof, a leaf spring mounted on said shutter and arranged to slidably engage said stop to retard the return movement of said shutter, and a part of said leaf spring arranged to engage said stop to prevent rebound of said shutter.

5. In a photographic shutter, the combination with an apertured shutter plate, a shutter pivotally mounted on said plate and adapted to be moved to uncover said aperture to make an exposure, actuating means for said shutter, of a pin on said plate adjacent the pivot point of said shutter, a shutter actuating spring having one end thereof secured to said shutter and the other end anchored to said pin, said pin being positioned in the path of said shutter to limit the return movementt hereof, a leaf spring secured to and movable with said shutter, said spring having the free end thereof positioned to slidably engage said pin to retard the return movement of said shutter, and means on the free end of said spring adapted to engage said pin to prevent rebound of said shutter.

6. In a photographic shutter, the combination with an apertured shutter plate, a shutter pivotally mounted on said plate and adapted to be moved to uncover said aperture to make an exposure, actuating means for said shutter, of a pin on said plate adjacent the pivot point of said shutter, a shutter actuating spring having one end thereof secured to said shutter and the other end anchored to said pin, a shoulder on said shutter adapted to engage said pin to limit the return movement of said shutter, a leaf spring secured to said shutter adjacent said shoulder, said spring having a bent end portion thereof positioned to slidably engage said pin to retard the return movement of said shutter, and a part on said bent end portion cooperating with said pin to prevent rebound of said shutter.

CHESTER W. CRUMRINE.